(12) United States Patent
Kirchner (10) Patent No.: US 12,488,703 B2
(45) Date of Patent: Dec. 2, 2025

(54) PORTABLE RESCUE DEVICE AND ARRANGEMENT COMPRISING A RESCUE DEVICE

(71) Applicant: LUKAS Hydraulik GmbH, Erlangen (DE)

(72) Inventor: Uwe Kirchner, Marloffstein (DE)

(73) Assignee: LUKAS HYDRAULIK GMBH, Erlangen (DE)

( * ) Notice: Subject to any disclaimer, the term of this patent is extended or adjusted under 35 U.S.C. 154(b) by 682 days.

(21) Appl. No.: 17/627,455

(22) PCT Filed: Jul. 18, 2019

(86) PCT No.: PCT/EP2019/069316
§ 371 (c)(1),
(2) Date: Jan. 14, 2022

(87) PCT Pub. No.: WO2021/008707
PCT Pub. Date: Jan. 21, 2021

(65) Prior Publication Data
US 2022/0262274 A1 Aug. 18, 2022

(51) Int. Cl.
*G09B 19/24* (2006.01)
*A62B 3/00* (2006.01)
(Continued)

(52) U.S. Cl.
CPC .............. *G09B 19/24* (2013.01); *A62B 3/005* (2013.01); *G06F 3/14* (2013.01); *G09B 5/065* (2013.01);
(Continued)

(58) Field of Classification Search
CPC ........ G09B 19/24; G09B 5/065; A62B 3/005; G06F 3/14; H04B 1/3888; B23D 29/00; B23D 17/00; B23D 31/008
See application file for complete search history.

(56) References Cited

U.S. PATENT DOCUMENTS

| 5,088,037 A | 2/1992 | Battaglia |
| 2003/0221876 A1* | 12/2003 | Doczy ................. G06F 1/1632 178/18.01 |

(Continued)

FOREIGN PATENT DOCUMENTS

| CN | 104039510 A | 9/2014 |
| CN | 205363679 U | 7/2016 |

(Continued)

OTHER PUBLICATIONS

International Search Report and Written Opinion of the International Searching Authority for International Patent Application No. PCT/EP2019/069316 mailed Apr. 20, 2020, 11 pages.

(Continued)

*Primary Examiner* — Jack Yip
(74) *Attorney, Agent, or Firm* — Panitch Scwharze Belisario & Nadel LLP (57) ABSTRACT

A portable rescue device (1), such as a spreader device, cutter device or combination device with a cutting and spreading function, for portable rescue operations includes a housing (2), a first hand grip (3) and a second hand grip (4) for two-handed actuation of the rescue device. An electric motor is in the housing (2) and a battery (15) is housed on the rescue device (1), or a connection to an external electrical power source. A mechanically or hydraulically driven movable piston rod (12) performs spreading and/or cutting. A display, which is provided on the housing (2). An electronic open- and closed-loop control device provides open- and/or closed-loop control of the electric motor (3) and/or of the display. The rescue device (1) has a communication interface (20) for video data (VD), the video data (VD) being user guidance data, and the display being a video-enabled display (8).

15 Claims, 9 Drawing Sheets

(51) Int. Cl.
  *G06F 3/14* (2006.01)
  *G09B 5/06* (2006.01)
  *H04B 1/3888* (2015.01)
  *B23D 17/00* (2006.01)
  *B23D 29/00* (2006.01)
  *B23D 31/00* (2006.01)

(52) U.S. Cl.
  CPC ........... *H04B 1/3888* (2013.01); *B23D 17/00* (2013.01); *B23D 29/00* (2013.01); *B23D 31/008* (2013.01)

(56) References Cited

U.S. PATENT DOCUMENTS

| | | | |
|---|---|---|---|
| 2012/0079923 A1* | 4/2012 | Huang | B25B 23/1425 81/479 |
| 2013/0153250 A1 | 6/2013 | Eckert | |
| 2014/0008088 A1 | 1/2014 | Chellew | |
| 2014/0148808 A1* | 5/2014 | Inkpen | A61B 90/06 73/866.5 |
| 2016/0046010 A1 | 2/2016 | Busscharet et al. | |
| 2017/0046810 A1* | 2/2017 | Vitet | G07C 5/008 |
| 2017/0057040 A1 | 3/2017 | Rzasa et al. | |
| 2017/0252585 A1* | 9/2017 | Desgroseilliers | A62B 3/005 |
| 2017/0252911 A1 | 9/2017 | Barezzani et al. | |
| 2018/0130377 A1* | 5/2018 | Meess | B23K 9/1087 |
| 2019/0083821 A1 | 3/2019 | Sauerbier et al. | |

FOREIGN PATENT DOCUMENTS

| | | |
|---|---|---|
| CN | 206708792 U | 12/2017 |
| CN | 108523402 A | 9/2018 |
| DE | 10 2011 121 469 A1 | 6/2013 |
| DE | 102015007266 A1 | 12/2016 |
| DE | 10 2015 115 469 A1 | 3/2017 |
| DE | 10 2015 226 084 A1 | 6/2017 |
| DE | 10 2017 206 064 A1 | 10/2018 |
| DE | 10 2018 100 517 A1 | 7/2019 |
| EP | 3 192 614 A1 | 7/2017 |
| JP | 2017062556 A | 3/2017 |
| JP | 2018160866 A | 10/2018 |
| JP | 2019510644 A | 4/2019 |
| WO | 2012/134469 A1 | 10/2012 |
| WO | 2017/190799 A1 | 11/2017 |

OTHER PUBLICATIONS

Office Action issued Jul. 12, 2022 in Chinese Application No. 201980098374.2 (English translation attached).
Office Action issued Dec. 2, 2022 in Chinese Application No. 201980098374.2 (English translation attached).
Chaozhu, Wen et al."Classification Methods and Case Analysis of Electromechanical Commodities", Apr. 30, 2019, China Customs Publishing House, p. 25 (English translation attached).
Notification of Reason(s) for Rejection issued Feb. 2, 2023 in JP Application No. 2022-502991 (machine translation).
Notice of Final Rejection issued May 30, 2023 in CN Application No. 201980098374.2.

* cited by examiner

PORTABLE RESCUE DEVICE AND ARRANGEMENT COMPRISING A RESCUE DEVICE

This application is a National Stage Application of PCT/EP2019/069316, filed 18 Jul. 2019, and which application is incorporated herein by reference. To the extent appropriate, a claim of priority is made to the above-disclosed application.

The present invention relates to a portable rescue device, such as a spreader device, cutter device or combination device with a cutting and spreading function, for portable rescue operations according to the preamble of claim 1.

TECHNOLOGICAL BACKGROUND

Rescue devices are mainly used by fire services and disaster response forces. They are portable and are used with both hands by the operator. In a rescue operation, the time factor is of crucial importance, as the survival of people who have had an accident or have been buried often depends on it. As a result, it is particularly important in a rescue operation that the particular user has a great deal of experience in handling the rescue device. However, problems can sometimes arise with users who do not yet have this wealth of experience. In the event of incorrect use, a considerable amount of time can be taken and this can therefore have fatal consequences for the person who has had an accident or has been buried.

There is therefore a fundamental need, as far as possible, to avoid incorrect use of a rescue device during operation that would take additional time.

Vehicles nowadays include a variety of safety systems such as airbags, emergency brake assistants, alternative drives and new materials. Modern vehicles are therefore becoming increasingly safer. However, concealed airbags or high-voltage power lines can endanger rescue personnel or accident victims when the latter are being rescued. High-strength materials and structures in the vehicle body can damage rescue tools or render them ineffective. It is all the more important nowadays that the emergency personnel know where on the vehicle body the rescue tool can be placed effectively and safely and which precautionary measures are necessary, for example, in order not to unintentionally trigger airbags or to reliably deactivate a high-voltage system of an electric car.

The emergency personnel can find relevant information in a so-called rescue card. This is a printout with manufacturer-specific data that should be attached behind the driver's sun visor by the vehicle owner. However, a rescue card is not placed accordingly by every vehicle owner. In addition, a rescue card can be lost or destroyed in an accident. However, even if a rescue card is found by the emergency personnel, the evaluation thereof by the particular user of the rescue device still requires a considerable amount of time in practice, since the information on the rescue card only involves textual and visual data that must still be processed intellectually.

In the field of rescue technology in particular, there is therefore a particular area of conflict between the fastest possible implementation of the rescue measures, on the one hand, and the processing of task-specific information, on the other hand.

DOCUMENTED PRIOR ART

From DE 10 2017 206 064 A1 a method for monitoring the progress of work on a construction site is known, in which a detection unit is arranged in the region of the construction site, detects at least one operating parameter of a hand-held power tool and transmits it to an evaluation unit, wherein, based on the detected operating parameters, characteristic values are determined that are relevant for the progress of work. The characteristic values are displayed on a display unit. The display unit is a smartphone.

DE 10 2015 226 084 A1 discloses a hand-held power tool that is equipped with a user guidance unit that communicates with a mobile computer or smartphone or tablet computer, so that settings relating to the user guidance of the hand-held power tool can be made via the mobile computer.

A tool system with a power screwdriver and an external operating unit is known from DE 10 2015 115 469 A1. The external operating part comprises a display and is wirelessly connected to the power screwdriver and a PC.

DE 10 2011 121 469 A1 relates to a battery-operated screwing tool which can be operated with an external USB/Bluetooth keyboard. The tool operating data stored in the tool memory can be queried using the external keyboard. The inputs by means of the external keyboard are shown on a display comprised by the tool, as are messages for the operator from the tool control. However, this does not involve video data.

Problem Addressed by the Present Invention

The problem addressed by the present invention is to reduce the frequency of operating errors of a portable rescue device.

Solution of the Problem

Because the rescue device has a communication interface for video data and the video data involve user guidance data, in particular video film sequences for user guidance, and the display is a video-enabled display, handling information can be given during use to the user via video directly on the rescue device which is guided by the user with one or two hands.

This enables the user to take appropriate measures at the same time during use, thereby considerably reducing the likelihood of operating errors and the resulting temporary interruptions or delays. The invention makes it possible, for example, to give the user of the rescue device detailed video instructions directly on the device, such as what to avoid in a certain type of car when cutting through car parts, such as a B or C pillar, in order not to inadvertently trigger a side impact airbag or the like. Particularly in rescue operations, the invention enables quick action, especially in situations in which the user needs additional information regarding the use of his rescue device.

According to an expedient embodiment, in addition to the video data, audio data can also be fed to the rescue device via the communication interface and can be made available as user guidance data. The user is thus able to receive and utilize linguistically supported film sequences as user guidance immediately during use. This increases the effectiveness of use of the rescue device to a very great extent.

A protective layer permanently fastened to the display is expediently located on the top of the display. This can be, for example, a hard glass layer or a transparent hard plastics layer.

Instead of or in addition to a protective layer permanently fastened to the display, to improve the mechanical protection of the display on the rescue device or the housing thereof, a protective cover can expediently be provided which, if required, can merely be removed briefly by the user during use of the rescue device in order to expose the display. If a situation arises during use in which rapid information is necessary, the protective cover on the display can be easily removed. Otherwise, the protective cover provides effective protection for the video-enabled display.

In particular, the protective cover can be designed in such a way that it can be detached from the display or from the housing of the rescue device and, if required, can be reunited with or connected to the display or housing of the rescue device.

It has been found to be particularly advantageous if the protective cover is movable in relation to the display, but remains captive on the rescue device or on the housing or display thereof during operation.

It is particularly advantageous if the protective cover can be displaced relative to the display, that is to say the display can be exposed by displacement of the protective cover. In this way, the display can be exposed with a single manipulation while the rescue device is in operation.

Likewise, the protective cover can also be fastened pivotably to the display. Here, too, the display can be exposed with one manipulation.

A further expedient embodiment of the present invention consists in providing a so-called folding display as the display. In the case of a folding display, two display areas are designed to be foldable with respect to one another, so that the display, in its folded state, is adequately protected against mechanical impairment during use of the rescue device.

Since the display as part of the rescue device can very often be exposed to intensive mechanical impairments, it is advantageous if a protective layer permanently attached to the display, such as a glass layer or a transparent plastics layer, is provided on the top of the display.

Since a rescue device is usually used under adverse conditions, it is an additional advantage if the display is provided with a protective cover if no information is required. The protective cover is designed in such a way that the display can be exposed at any time during operation, or can be covered again after the video or video/audio information has been received. This ensures that the display is only openly accessible during the actual playback of video or video/audio information, whereas it remains protected during storage or use.

The protective cover can expediently be detachable, i.e. removable, from the display or housing, for example via a latching connection, and can then be reconnected to the display or housing.

In particular, the protective cover can also be fastened to the rescue device in such a way that it cannot be lost, with the latter only being able to be changed in its position relative to the display or housing to expose the display. This prevents the protective cover from being inadvertently misplaced and no longer being able to be found after the video or video/audio information has been made available.

The protective cover is expediently arranged to be displaceable relative to the display. In particular, the protective cover can be fastened so as to be displaceable in the longitudinal direction for the longitudinal extension of the rescue device. As a result, the protective cover does not have a disruptive effect when the display is exposed.

Alternatively, the protective cover can also be pivoted relative to the display. This also enables simple handling.

According to an expedient embodiment, the display is provided as a so-called folding display. It can be folded up like a book, which at the same time ensures adequate mechanical protection. As soon as information is required, the folding display is unfolded.

Furthermore, the display can also be provided with a curved outer surface. This has the advantage that the video information can be better recognized by the user during use.

The video data and/or audio data are preferably compressed data.

As far as the user guidance data are concerned, these are in particular user guidance data specific to a car manufacturer and/or specific to rescue data. This makes it possible, for example, that as soon as the user, e.g. a firefighter, arrives at the scene of the accident, he can play back information relating to the vehicle involved in the accident via the display in the form of video data or video/audio data to show him how, for example in the case of a battery-operated vehicle, he can safely deactivate the high-voltage source in order to prevent inadvertent cutting of high-voltage cables during the rescue.

The communication interface on the rescue device can be a near-field communication interface or an RFID-based interface (NFC interface), a wireless communication interface with a maximum range of 100 m, preferably a so-called Bluetooth interface or a WLAN interface, a wired interface or a combination of at least two of the aforementioned different interfaces. For example, data from a smartphone can be easily transmitted to the rescue device or the memory thereof via one of the aforementioned interfaces.

The rescue device can also be switched on and/or off in an advantageous manner via the display, i.e. by actuation of the display. A separate mechanical on or off switch, which was previously common with rescue devices, is no longer necessary. This helps to reduce the manufacturing costs.

The invention further relates to an arrangement comprising a rescue device according to at least one of claims 1 to 14 and a computer that is portable by the user, wherein the video data or video data and audio data can be transmitted to the rescue device by means of the computer that is portable by the user.

DESCRIPTION OF THE INVENTION USING EMBODIMENTS

Expedient embodiments of the present application are explained in more detail below. For the sake of clarity, recurring features are provided only once with a reference sign. In the drawings:

FIG. 7 is a greatly simplified partial sectional representation of a rescue device according to the present invention, in which a folding display is used in the unfolded state (FIG. 7*a*) and in the folded state (FIG. 7*b*);

Figure 1:
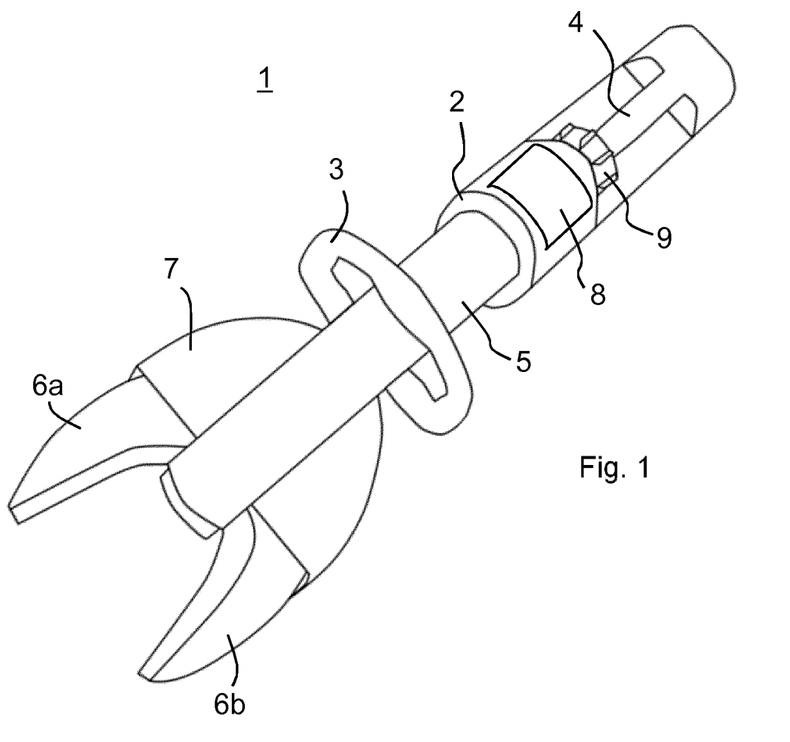
FIG. 1 shows a first embodiment of a portable rescue device according to the invention.

FIG. 1 shows a first embodiment of a rescue device according to the present invention. The reference numeral 1 designates the rescue device in its entirety. The rescue device 1 shown in FIG. 1 is a cutter device (cutter) which is used, for example, by emergency personnel to free people who have had an accident in road traffic. The rescue device 1 is portable, i.e. it can be carried by hand by an operator.

The rescue device 1 comprises a housing 2, with a hydraulic cylinder 5 connected to the front side of the housing. In the front region of the rescue device 1 there are two tool halves 6a, 6b. In the example shown in FIG. 1, there are two cutting edges. In addition, the rescue device 1 comprises a cover 7 and a first hand grip 3, which serves as a carrying handle, in the region of the hydraulic cylinder 5, and a second hand grip 4, which is gripped around during use, in the region of the housing 2. In the region of the second hand grip 4 there is a handle 9, for example a so-called star grip, with which the relevant working direction of the tool halves 6a, 6b can be selected by the operator.

During use, the rescue device 1 is held by the operator with two hands on the two hand grips 3, 4.

In addition, the rescue device 1 comprises a video-enabled display 8. A "video-enabled display" is to be understood as a display which is able to play back or display video data VD, that is to say films or film sequences. The video data VD can be played back as black and white films or as color films. The video data VD are so-called user guidance data, that is to say video data relating to the use of the rescue device 1. This makes it possible, during use, for the user of the rescue device 1 to play video data VD relating to the use of the rescue device 1 on the vehicle that has actually been involved in the accident, for example after arriving at a car that has been involved in an accident. For example, he can use this to display where or how the high-voltage supply can be deactivated in the car. The user of the rescue device 1 is thus "guided" in his rescue measures by first deactivating the high-voltage circuit of the car and then cutting through electrical connections with the rescue device 1.

The video-enabled display 8 is preferably a so-called touch screen, i.e. a display via which control commands can be entered by the user by touch.

Figure 2:
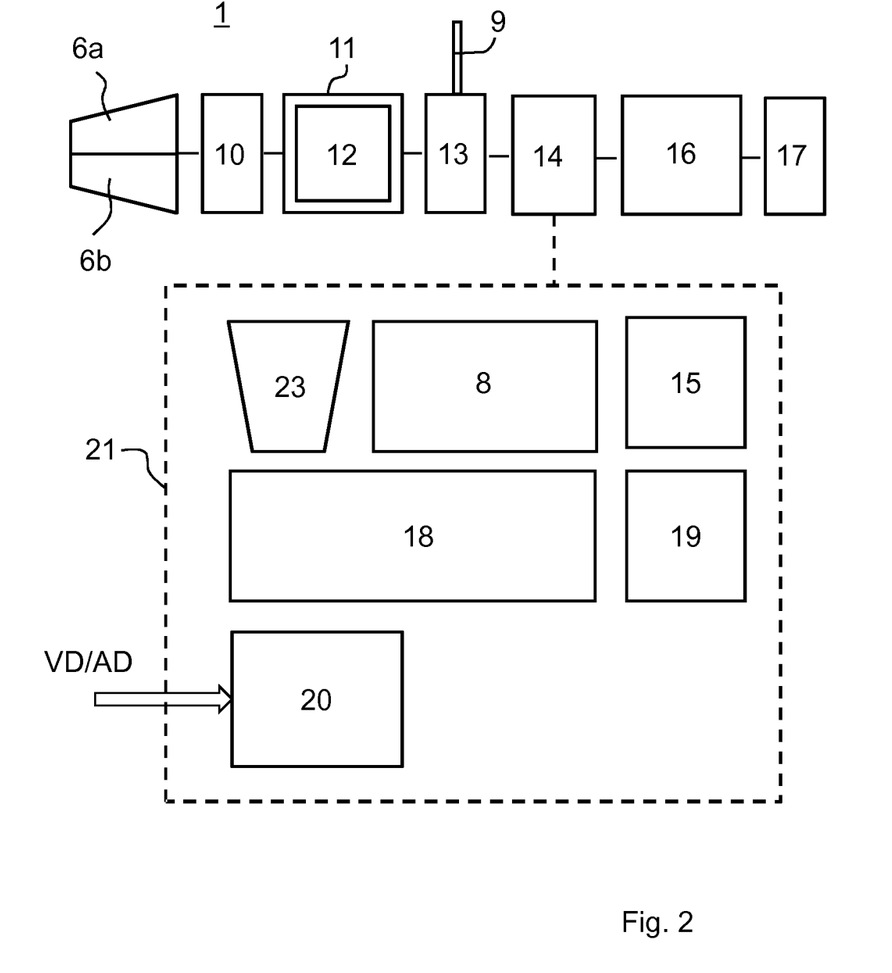
FIG. 2 is a greatly simplified schematic representation of the essential functional components of a rescue device including the open- and closed-loop control unit thereof according to the present invention.

FIG. 2 shows the essential functional elements of the rescue devices 1 of the individual embodiments in a greatly simplified schematic representation. The mechanical part of the rescue device 1 is located in the upper region of FIG. 2. This comprises a hydraulic tank 16 for storing hydraulic fluid and a hydraulic cylinder 11 with a piston rod 12 which is located therein and is connected to the tool halves 6a, 6b via a mechanical linkage 10. Depending on the position of the piston rod 12, due to the mechanical linkage 10, the tool halves 6a, 6b are either moved towards or away from one another. The reference numeral 13 denotes a so-called multi-way valve, which determines whether the piston rod 12 is extended or retracted in the hydraulic cylinder or whether the controller 5 is in a passive state in which hydraulic fluid is only fed back from the hydraulic tank 16 to the multi-way valve 13 and in bypass mode. To operate the multi-way valve 13, a handle 9 is provided which, in the example shown in FIG. 1, is designed as a star grip.

Furthermore, the rescue device comprises a hydraulic pump 14 and a compensation device 17 on the tank, which ensures that volume compensation can take place depending on the position of the piston rod 12 within the hydraulic cylinder 11.

The hydraulic pump 14 is controlled by an open- and closed-loop control unit 21, which is also shown schematically in a highly simplified manner in FIG. 2. It comprises a processor 18 with a memory 19 and a battery 15 which is carried on the rescue device 1. In addition, the open- and closed-loop control unit 21 also includes the video-enabled display 8 and a loudspeaker 23 for reproducing audio data.

In order to supply the video-enabled display 8 with corresponding video data VD, a communication interface 20 for video data VD is provided. Via the communication interface 20, video data VD can be transmitted to the rescue device 1 or the open- and closed-loop control unit 21 thereof, stored in the memory 19 and can be retrieved via the processor 18 if required. The control and/or command input is preferably carried out via the video-enabled display 8, which is designed as a touch screen.

In addition, if required, not only video data VD but also audio data AD can be transmitted to the rescue device 1 via the communication interface 20.

Figure 10:
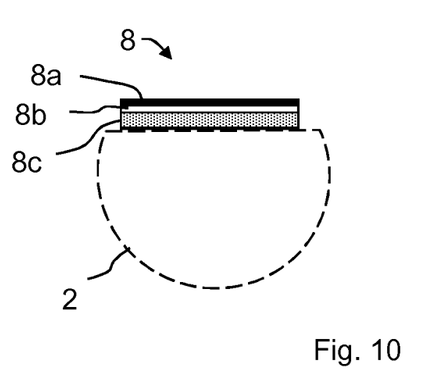
FIG. 10 is a greatly simplified partial sectional representation of a rescue device according to the present invention using a planar display.

The video-enabled display 8 expediently has a protective layer 8a which is permanently fastened to the display 8, cf. FIG. 10. This can be a glass layer or a transparent plastics layer. A so-called touch foil 8b is located below it. Below this is the display layer sequence 8c, which can be, for example, a so-called LCD display (liquid crystal display).

Figure 3:
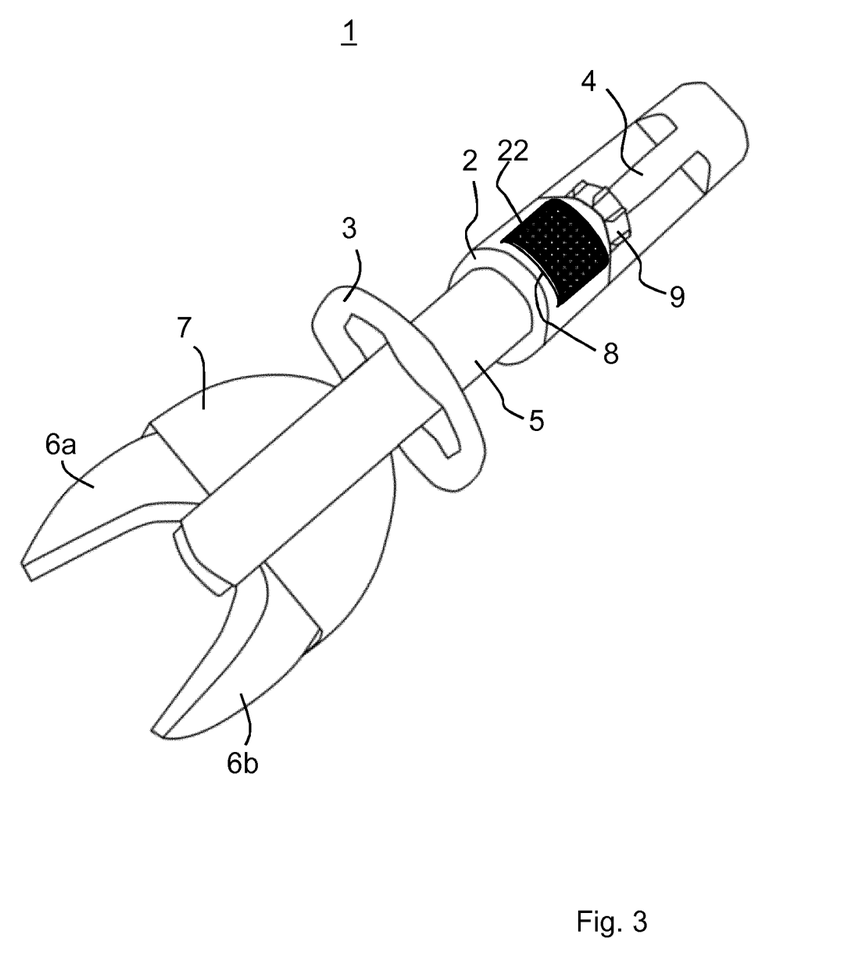
FIG. 3 shows a second embodiment of a rescue device according to the present invention.
Figure 4:
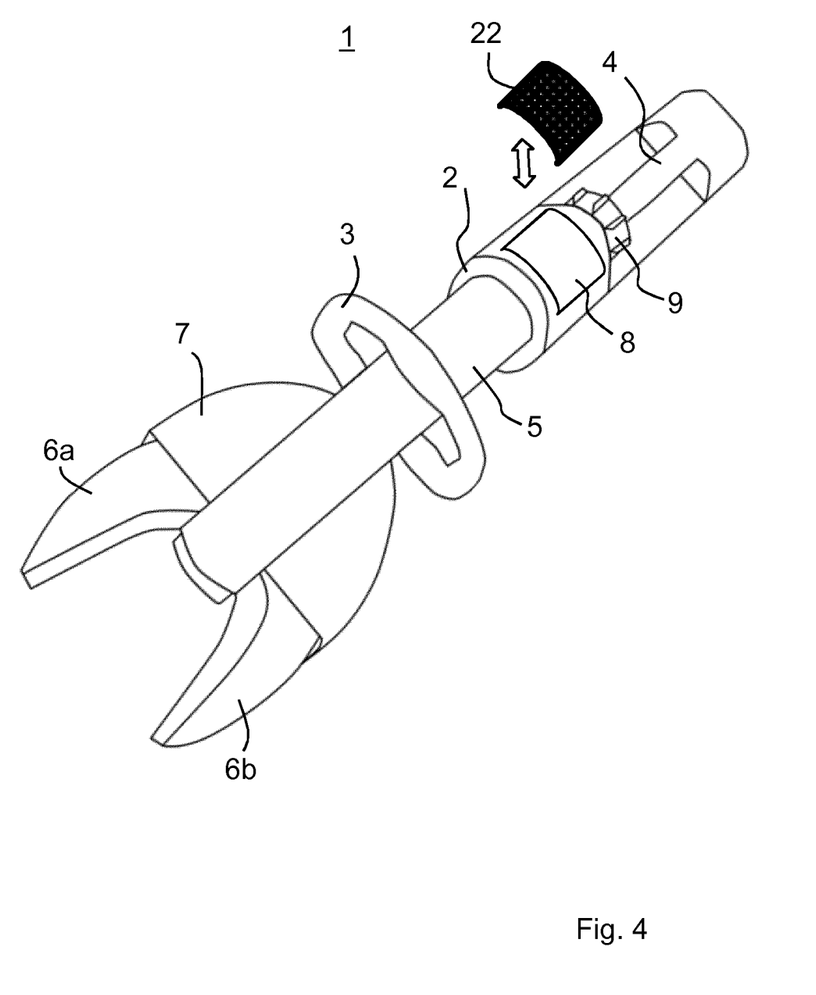
FIG. 4 shows the rescue device according to FIG. 3 with the protective cover removed.

FIG. 3 shows a further embodiment of the rescue device 1 according to the invention, in which the video-enabled display 8 is covered by means of a protective cover 22. The protective cover 22 ensures that the display 8 cannot be damaged during storage and also during use of the rescue device 1. The protective cover 22 is a cover which is effective against impact, pressure and/or scratch damage and which surrounds the display 8. The protective cover 22 is only removed, i.e. the display 8 is exposed, when the user requires information from the display. For this purpose, the protective cover 22 can be fixed to the housing 2 of the rescue device 1 via a suitable mechanically releasable connection, for example a latching or snap connection (not shown in each case) or at least one holder. If necessary, as shown in FIG. 4, the connection can be released to expose the display 8, so that the protective cover 22 can be removed.

Figure 5:
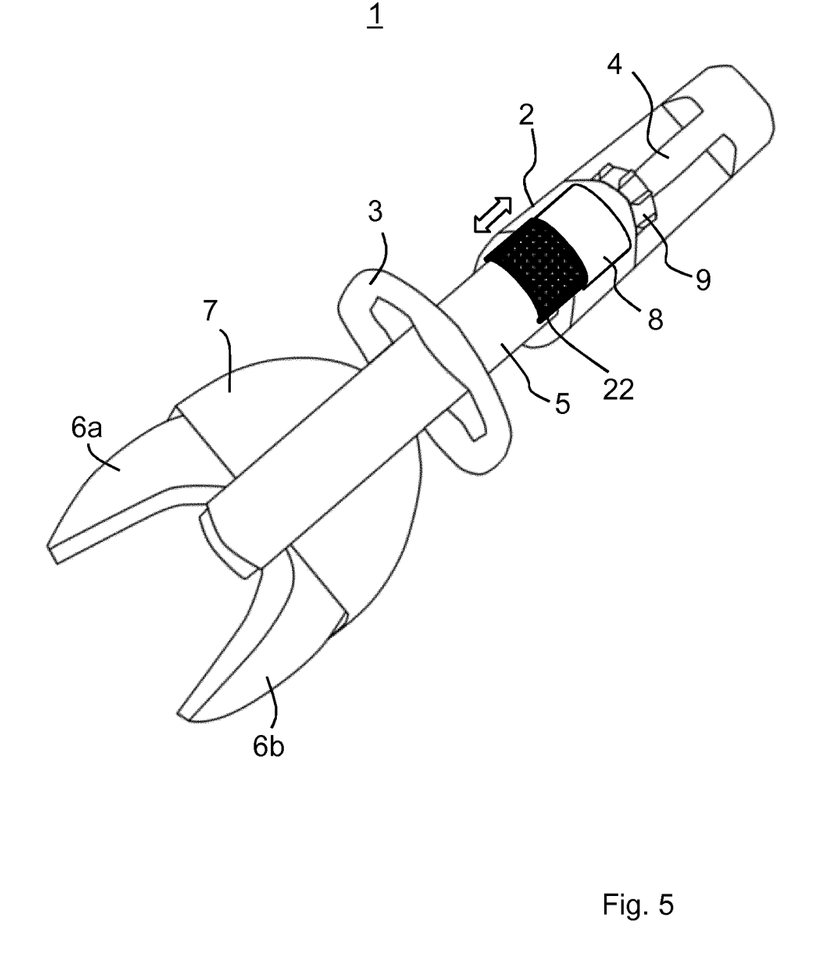
FIG. 5 shows a third embodiment of a rescue device according to the present invention.

In the embodiment of the rescue device 1 according to FIG. 5, the protective cover 22 remains on the rescue device 1 during storage and operation. However, its position in relation to the display 8 or housing 2 can be changed. In the example shown in FIG. 5, the protective cover 22 is fastened to the housing 2 or display 8 in such a way that it can be displaced in the direction of the tool halves 6a, 6b, that is, along the main extent of the rescue device 1, as a result of which the display 8 is exposed. If the operator has received the information, the protective cover 22 is moved back into the starting position over the display 8.

Figure 6:
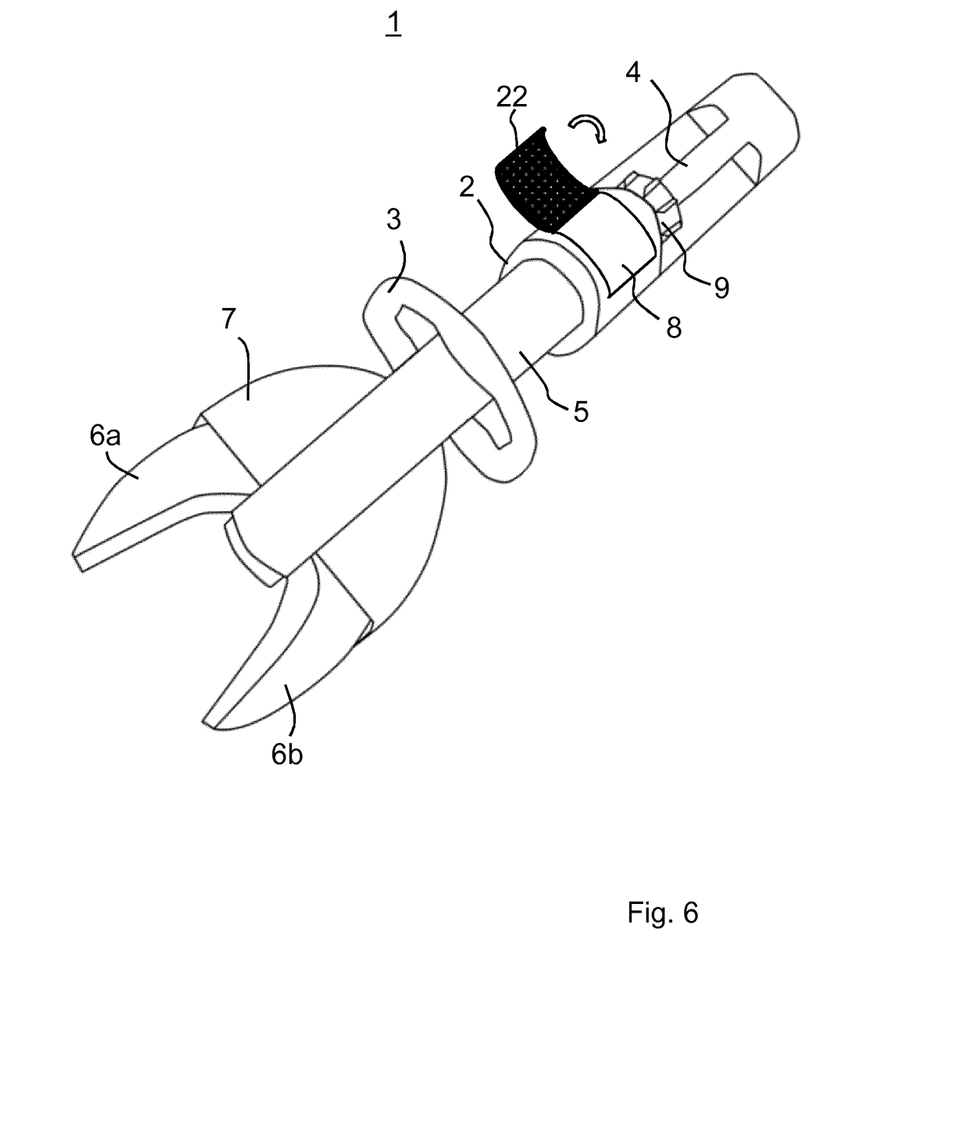
FIG. 6 shows a fourth embodiment of a rescue device according to the present invention.

Alternatively, as shown in FIG. 6, the fastening of the protective cover 22 can also be designed in such a way that the protective cover 22 can be opened to the side of the display 8. This also enables the display 8 to be exposed quickly and subsequently reclosed.

Figure 7A:
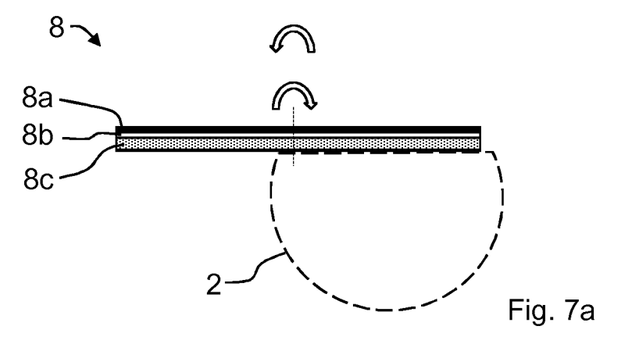
Figure 7B:
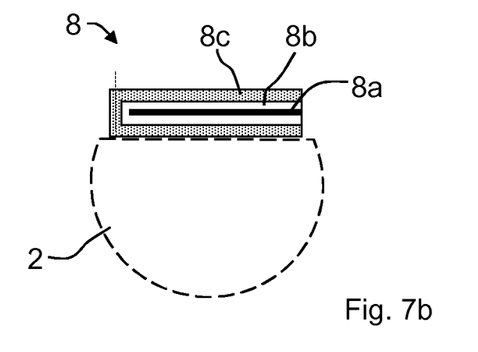

According to an expedient embodiment of the present invention, the display 8 can also be designed as a so-called folding display. Here, too, the display 8 comprises a protective layer 8a, a touch foil 8b and the actual display layer sequence 8c. However, the protective layer 8a, like the touch foil 8b, must be flexible in this case. In the folded state according to FIG. 7b, the display 8 is protected against mechanical impairment. If the user requires information, he only needs to unfold the folding display, as shown in FIG. 7a. On the underside of the display 8, the outline of the housing 2 is shown in a greatly simplified manner.

Figure 8:
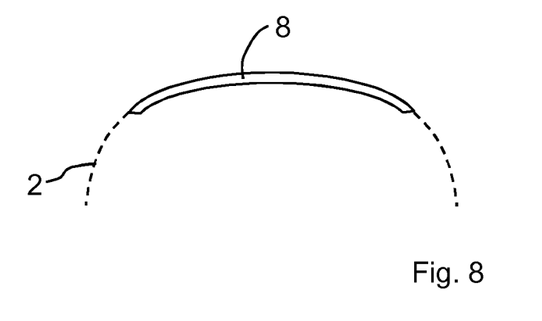
FIG. 8 shows a greatly simplified embodiment of a rescue device according to the invention using a curved display.

According to a particularly expedient embodiment, the display 8 can also be curved, as shown in FIG. 8. The respective layers 8a, 8b and 8c are omitted in the illustration according to FIG. 8 for the sake of clarity. However, the curved display 8 according to FIG. 8 can also contain the layer sequence 8a-8c. The curved display 8 ensures that the user can see the video data VD even better during use. In addition, the curvature of the display 8 adapts approximately to the curved course of the housing 2.

Figure 9:
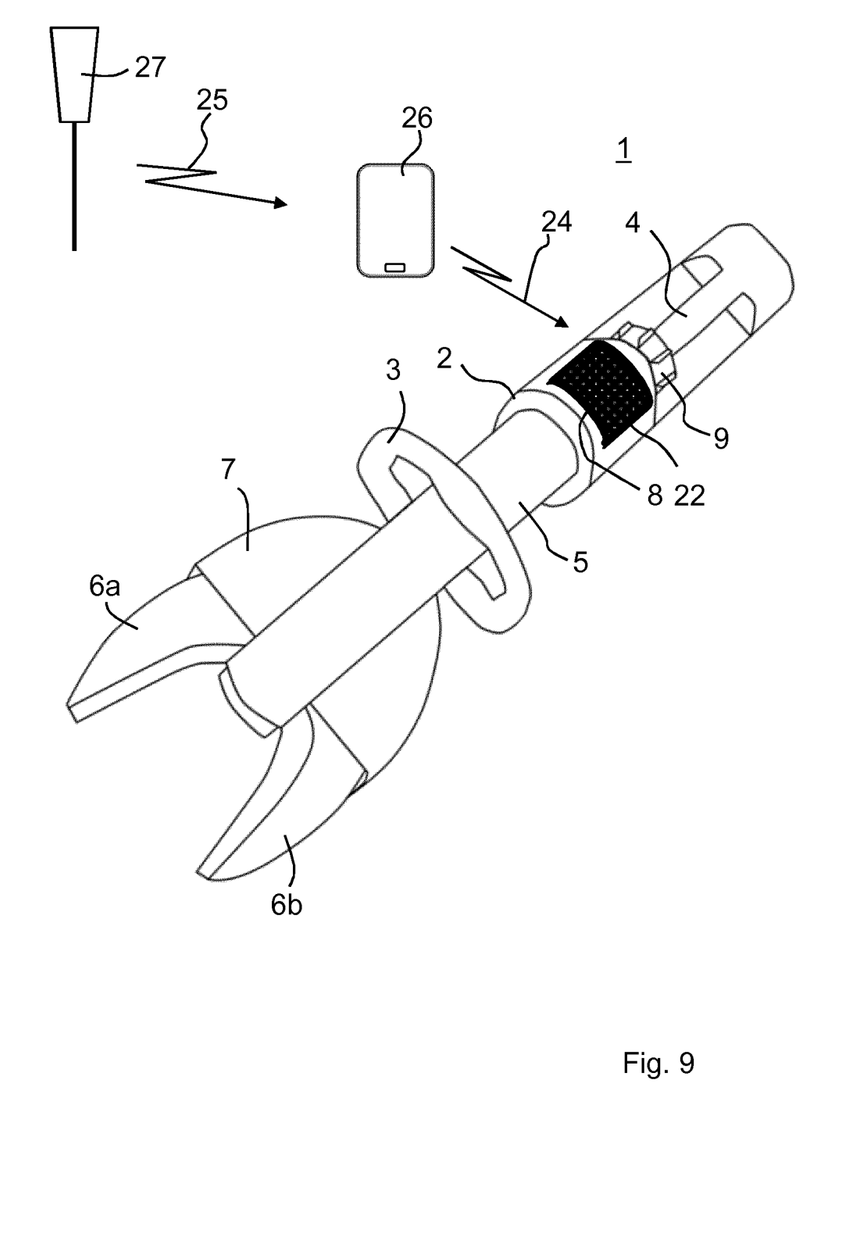
FIG. 9 is a representation of a possibility of transmitting user guidance data to the rescue device according to the present invention.

From FIG. 9 it can be seen how data can be transferred to the rescue device 1. Correspondingly, near-field communication, wireless communication or wired communication can be established via the communication interface 20, see FIG. 2, with a portable computer 26, expediently a smartphone or hand-held device. In the embodiment shown in FIG. 9, wireless communication 24 is provided between the portable computer 26 and the rescue device 1. The data of the portable computer 26 can in turn be transmitted by the latter, for example via a GSM communication network 25 or WAN network. The reference numeral 27 shows an example of a transmission mast of the GSM communication network 25.

The communication interface 20 is, for example, a near-field communication interface or an RIFD-based interface, also called an NFC interface. With such communication, the portable computer 26 or the smartphone is brought into close proximity to the corresponding receiving part in the open- and closed-loop control unit 21 of the rescue device 1, whereupon data can be transmitted.

Alternatively, a wireless communication interface with a maximum range of 100 m, preferably a Bluetooth interface or a WLAN interface, can also be provided. As an alternative or in addition, it is also possible to transfer data from the portable computer 26 to the rescue device 1 by cable.

The rescue device can also be switched on and/or off in an advantageous manner via the display 8, i.e. by actuating the display 8. A separate mechanical on or off switch is thus no longer necessary.

It is emphasized that the rescue devices 1 of the present examples can also be a spreader or a so-called combination device, which can be used both for cutting and for spreading. Likewise, a rescue device according to the invention can also be a so-called rescue cylinder which has only one hand grip and is guided by the operator with only one hand during use. When using a rescue cylinder, it is also very important to be able to retrieve user guidance data quickly during the operation if necessary.

It is expressly pointed out that sub-combinations of the features of the individual embodiments of the invention described in the text are also considered to be included in the subject matter of the invention.

REFERENCE LIST 1 rescue device
2 housing
3 first hand grip
4 second hand grip
5 cylinder
6a tool half
6b tool half
7 cover
8 display
8a protective layer
8b touch foil
8c display layer sequence
9 handle
10 mechanical linkage
11 hydraulic cylinder
12 piston rod
13 multi-way valve
14 hydraulic pump
15 battery
16 hydraulic tank
17 compensation device
18 processor
19 memory
20 communication interface
21 open- and closed-loop control unit
22 protective cover
23 loudspeaker
24 wireless communication
25 GSM communication network
26 portable computer
27 transmission mast
VD video data
AD audio data

The invention claimed is:

1. A portable rescue device with a cutting and spreading function or with a rescue cylinder, for portable rescue operations, wherein the portable rescue device comprises:
   a housing;
   two operating modes including:
      a first mode including a first hand grip for one-handed actuation of the rescue device by a user; and
      a second mode including the first hand grip and a second hand grip for two-handed actuation of the rescue device by the user;
   an electric motor provided in the housing;
   a power supply selected from one or more options: an integrated battery provided in the housing or an external electrical power source connected via a power connection;
   a mechanically or hydraulically driven movable piston rod for performing spreading work or cutting work;
   a video-enabled display integrated with the housing;
   an electronic control device for open-loop and closed-loop control of the electric motor and the display;
   a communication interface for video data;
      wherein the video data represent car manufacturer-specific user guidance data or rescue card-specific user guidance data, and
      wherein the video data are transmittable via the communication interface to said electronic control device.

2. The rescue device according to claim 1, wherein the rescue device has a communication interface for audio data, wherein the audio data represent user guidance data.

3. The rescue device according to claim 1, comprising a protective layer permanently fastened to a top of the display.

4. The rescue device according to claim 1, comprising a protective cover for the display, wherein the protective cover is removable during operation to expose the display.

5. The rescue device according to claim 4, wherein the protective cover is detachable, via a latching connection, from the display or housing.

6. The rescue device according to claim 4, wherein the protective cover remains on the rescue device during operation by fastener, wherein a position can be changed relative to the display or housing.

7. The rescue device according to claim 4, wherein the protective cover is displaceable relative to the display.

8. The rescue device according to claim 4, wherein the protective cover pivots relative to the display.

9. The rescue device according to claim 1, wherein the display is a foldable display.

10. The rescue device according to claim 1, wherein the display is curved.

11. The rescue device according to claim 1, wherein the video data or audio data are compressed.

12. The rescue device according to claim 1, wherein the communication interface is selected from one or more:
- a near-field communication interface,
- an RFID-based interface,
- a wireless communication interface with a maximum range of 100 m,
- a wired interface, or
- a combination thereof.

13. The rescue device according to claim 12, wherein the wireless communication interface comprises a Bluetooth interface or a WLAN interface.

14. The rescue device according to claim 1, wherein the rescue device is switched on and off via the display.

15. An arrangement comprising a rescue device according to claim 1 and a portable computer, wherein the video data, or video data and audio data are transmittable to the rescue device by the portable computer.

* * * * *